United States Patent [19]
Richter

[11] Patent Number: 6,032,910
[45] Date of Patent: *Mar. 7, 2000

[54] FLEXIBLE SUPPORT ARM FOR SUPPORTING OBJECTS

[76] Inventor: Herbert Richter, Drosselweg 8, 75331 Engelsbrand, Germany

[ * ] Notice: Under 35 U.S.C. 154(b), the term of this patent shall be extended for 39 days.

[21] Appl. No.: 08/697,214

[22] Filed: Aug. 21, 1996

[30] Foreign Application Priority Data

Aug. 24, 1995 [DE] Germany ........................ 295 13 581 U

[51] Int. Cl.⁷ .................................................. E04G 3/00
[52] U.S. Cl. ...................... 248/274.1; 224/553; 224/929; 108/1
[58] Field of Search ................................ 248/274.1, 160, 248/447, 447.1, 479, 177.1, 178.1, 292.12, 291.1; 362/198, 285, 287, 413, 418, 419; 108/1, 50; 224/483, 557, 567, 929, 548, 553; 174/111

[56] References Cited

U.S. PATENT DOCUMENTS

| | | | |
|---|---|---|---|
| 809,977 | 1/1906 | O'Brien | 248/160 X |
| 1,719,154 | 7/1929 | Wetherbee et al. | 248/274.1 X |
| 1,995,656 | 3/1935 | Stout | 248/292.12 |
| 3,652,441 | 3/1972 | Esselin et al. | 174/111 X |
| 3,962,678 | 6/1976 | Kurokawa | 362/413 X |
| 4,560,831 | 12/1985 | Bast et al. | 224/553 X |
| 4,842,174 | 6/1989 | Sheppard et al. | 248/160 X |
| 5,135,189 | 8/1992 | Ghazizadeh | 248/160 X |
| 5,187,744 | 2/1993 | Richter . | |
| 5,521,803 | 5/1996 | Eckert et al. | 248/160 X |
| 5,542,589 | 8/1996 | McKee . | |

FOREIGN PATENT DOCUMENTS 9476   5/1893   United Kingdom ................... 248/540

OTHER PUBLICATIONS

FLEXINECK Control Head Mounts, Ora Electronics Catalog, p. 21, 1989.

SMC Electro–Mount Catalog, front cover and pages 1 and 4, Nov. 1994.

Primary Examiner—Ramon O. Ramirez
Assistant Examiner—Stephen S. Wentsler
Attorney, Agent, or Firm—Klaus J. Bach

[57] ABSTRACT

In a support device for supporting objects, particularly inside a vehicle, by way of a flexible arm extending between a mounting base and a mounting plate, the flexible arm consists of an elastically flexible plastic tube with a permanently bendable aluminum rod disposed within, whereby objects such as a portable CD player or cellular telephone can be supported in various positions.

6 Claims, 1 Drawing Sheet

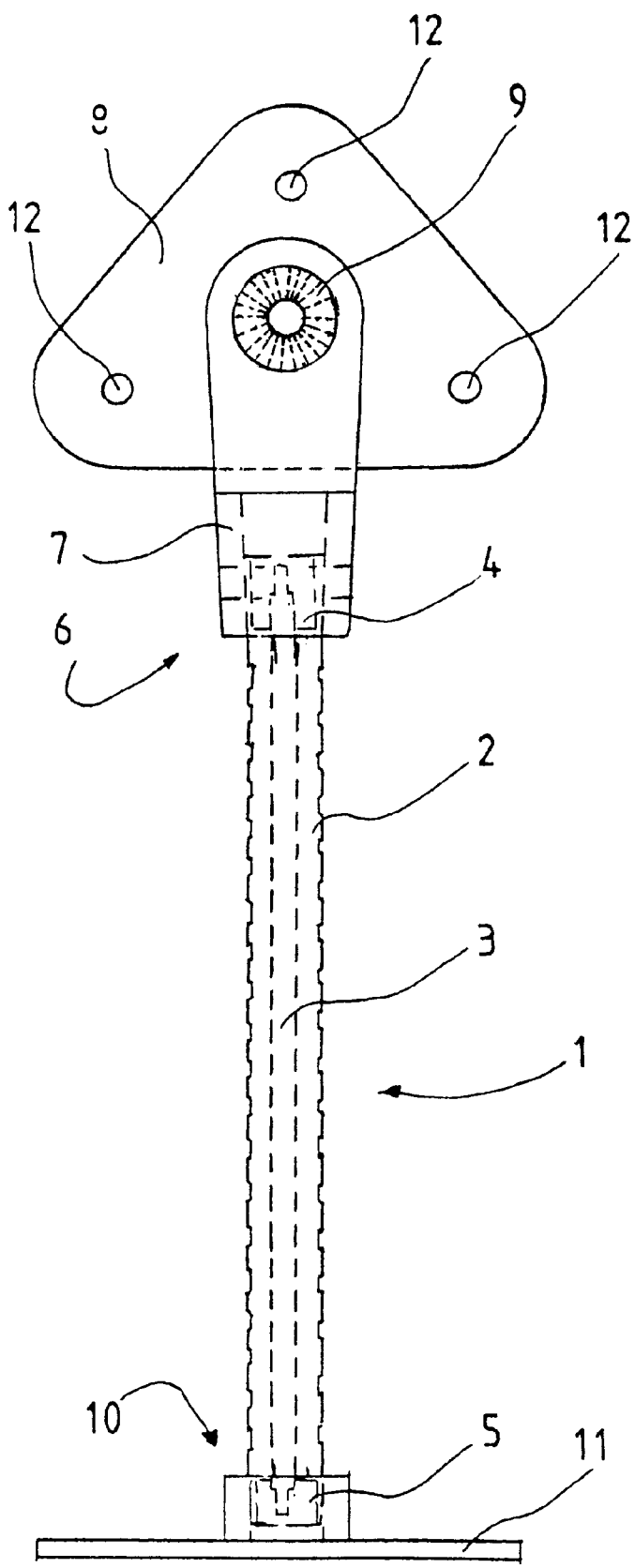

FLEXIBLE SUPPORT ARM FOR SUPPORTING OBJECTS

BACKGROUND OF THE INVENTION

The invention resides in a support device including a flexible arm for supporting objects especially in a motor vehicle.

A support device of this kind is for example known as a support for automotive audio equipment. The flexible support arm is composed of a plastic or laminated metal tube surrounding a thin-walled aluminum tube. Support arms of this type however, are sensitive to buckling, and are difficult to manufacture and therefore quite expensive.

It is the object of this invention to provide a simple and therefore cost-effective support arm.

SUMMARY OF THE INVENTION

In a support device for supporting objects, particularly inside a vehicle, by way of a flexible arm extending between a mounting base and a mounting plate, the flexible arm consists of an elastically flexible plastic tube with a permanently bendable aluminum rod disposed within, whereby objects such as a portable CD player or a cellular telephone can be supported in various positions.

Such a flexible arm can be manufactured inexpensively from stock tube and standard rod material such as a rod or wire.

Preferably, the tube is a corrugated plastic tube and the rod is an aluminum rod disposed axially within the tube.

With the outer corrugated plastic tubing the flexible arm has an attractive appearance and it can be handled easily. With the aluminum rod disposed in the flexible plastic tube the flexible arm is retained by the rod in a position into which it is bent as the aluminum rod will not permit the plastic tub to return to its initial position. The aluminum rod gives the flexible arm the necessary strength.

In an advantageous embodiment, the diameter of the aluminum rod is half the inner diameter of the plastic tube. In this fashion, the strength of the flexible arm is not only optimally adapted to its diameter but it is also possible to run an electrical wire through the plastic tube. Also, the plastic tube appears to be smoothly curved even if the rod or wire within is not. It is particularly advantageous if both ends of the tube are closed with plugs which are firmly attached to the tube and to the rod. The ends of the rod and the plugs are flattened and the plugs have openings receiving the flattened ends of the rod in a formlocking manner so that the rod and the tube are also firmly interconnected. Such flexible arm acts essentially like a plastic tube with a thin-walled aluminum tube disposed therein but is much sturdier, less expensive and provides for a smoother appearance.

For mounting the support device to the inside of a vehicle a mounting base is provided with a compression joint in which one end of the flexible arm is mounted. In an advantageous embodiment, the compression joint is pivotally attached to the mounting base. In a particularly advantageous embodiment, the compression joint is held in place by radial teeth formed on the base.

The flexible arm is placed into an opening in the compression joint which can be tightened by a screw so that the flexible arm is tightly fixed. With the swiveling arrangement of the compression joint on the base, the flexible arm can be adjusted to particularly advantageous positions. The swivel-type support of the compression joint permits the mounting of the support base in an optimal location in the passenger compartment so that the flexible arm does not inconvenience an occupant. The compression joint is arranged on the base depending on the mounting location in the vehicle.

Instead of mounting the flexible arm by means of a compression joint the flexible arm can also be attached directly to the support base if this should be necessary. Such a connection could be established for example by a commercially available clamp.

The other end of the flexible arm preferably carries a mounting plate. The mounting plate assures universal use capability of the device as for example, dash board instruments, a mirror, or a mount for a cassette or CD player could be disposed on the mounting plate. Also a holder for a telephone or other devices could be disposed on the mounting plate.

Further details are described below on the basis of the accompanying drawing.

BRIEF DESCRIPTION OF THE DRAWING

The sole FIGURE is a schematic view of a particular embodiment of the support device.

DETAILED DESCRIPTION OF THE INVENTION

A support device as shown in FIG. 1 comprises a flexible arm 1, which consists of a plastic tube 2 and an aluminum rod 3 disposed within. The ends of the aluminum rod 3 are flattened. Both ends 6, 10 of the flexible arm 1 are closed by plugs 4, 5 received in the plastic tube 2. The plugs 4, 5 have recesses in which the flattened ends of the aluminum rod 3 are form-lockingly received. In this manner, the plastic tube 2 is firmly attached to the aluminum rod 3.

One end 6 of the flexible arm 1 is held in a compression joint 7. The compression joint 7 is in turn fixed to a base 8. The compression joint 7 is connected to the base 8 by a screw (not shown), which extends through bores in the compression joint and the base. At the contact area 9 between the compression joint 7 and the base 8, there are raised, radial teeth on one side and grooves to receive the teeth on the other to prevent the compression joint 7 from swiveling on the base 8 when the compression joint is tightened.

The base 8 has three bores 12 for firmly mounting the support device in a vehicle. When necessary, the base can be square-shaped with four holes instead of three. The flexible arm 1 can also be mounted directly to the base 8 by, for example, a commercially available clamp. A mounting plate 11 is arranged on the other end of the flexible arm 1. The end of the flexible arm 1 fits into a cup on the mounting plate 11 whereby it is firmly attached to the mounting plate 11. The mounting plate 11 is a flat plate for versatility. Objects to be held by the flexible support arm can be attached by gluing, screwing or clamping on. It is also possible that the mounting plate 11 has recesses so that objects with appropriate engaging means can be snapped or slid onto the mounting plate 11 in the manner as shown in applicants copending application Ser. No. 08/670,459.

What is claimed is:

1. A support device for supporting objects particularly inside a vehicle including a rod-shaped flexible arm adapted to be supported at one end thereof and to support an object at the opposite end, said flexible arm comprising an elastically flexible, corrugated plastic tube with a permanently bendable aluminum rod extending centrally through said flexible, corrugated plastic tube, said rod having a diameter which is about half the diameter of said flexible corrugated plastic tube.

2. A support arm according to claims 1, wherein plugs are disposed in both ends of said flexible tube said plugs firmly engaging said rod so as to interconnect said flexible tube and said rod.

3. A support arm according to claim 2, wherein both ends of said rod are flattened and, received in corresponding recesses formed in said plugs.

4. A support arm according to claim 1, wherein one end of said flexible arm is attached to a clamping structure which is mounted on a base.

5. A support arm according to claim 4, wherein said clamping structure is pivotally supported on said base.

6. A support arm according to claims 4, wherein a mounting plate is attached to the other end of said flexible arm.

* * * * *